(12) United States Patent
Zavesky et al.

(10) Patent No.: US 10,953,541 B2
(45) Date of Patent: Mar. 23, 2021

(54) PROVIDING LOGISTICAL SUPPORT FOR ROBOTS

(71) Applicant: AT&T Intellectual Property I, L.P., Atlanta, GA (US)

(72) Inventors: Eric Zavesky, Austin, TX (US); David Crawford Gibbon, Lincroft, NJ (US); Bernard S. Renger, New Providence, NJ (US); Tan Xu, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 259 days.

(21) Appl. No.: 16/050,232

(22) Filed: Jul. 31, 2018

(65) Prior Publication Data

US 2020/0039070 A1 Feb. 6, 2020

(51) Int. Cl.
*B25J 9/16* (2006.01)
*B25J 13/00* (2006.01)

(52) U.S. Cl.
CPC .......... *B25J 9/1653* (2013.01); *B25J 13/006* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 6,266,577 B1 * | 7/2001 | Popp | ........................ | B25J 9/163 700/245 |
| 6,678,667 B1 * | 1/2004 | Ammon | .................. | G06N 20/00 706/14 |
| 7,254,464 B1 * | 8/2007 | McLurkin | ............ | G05D 1/0297 294/86.4 |
| 7,283,893 B2 * | 10/2007 | Hara | ...................... | B25J 9/1682 318/568.16 |
| 8,112,176 B2 * | 2/2012 | Solomon | .............. | G05D 1/0088 700/245 |

(Continued)

FOREIGN PATENT DOCUMENTS

| | | |
|---|---|---|
| CN | 101364110 B | 8/2010 |
| CN | 102033536 B | 12/2012 |

(Continued)

OTHER PUBLICATIONS

Szondy, David. "Crowdsourcing could help robots learn new tasks faster." New Atlas: Robotic, newatlas.com, Jun. 30, 2014. https://newatlas.com/uw-crowdsourced-assistance-robot/32747/.

(Continued)

*Primary Examiner* — Jonathan L Sample (57) ABSTRACT

The present disclosure describes a device, computer-readable medium, and method for providing logistical support for robots. In one example, the method includes receiving, at a centralized support center that is in communication with a plurality of robots, a query from a first robot of the plurality of robots that has been deployed to perform a task, wherein the query indicates an error encountered by the first robot and evidence of the error collected by the first robot, formulating, at the centralized support center, a proposed solution to resolve the error, wherein the formulating comprises soliciting an analysis of the evidence by a party other than the first robot, and delivering, by the centralized support center, the proposed solution to the first robot.

20 Claims, 5 Drawing Sheets

(56) References Cited

U.S. PATENT DOCUMENTS

| | | | | |
|---|---|---|---|---|
| 8,639,644 | B1* | 1/2014 | Hickman | G06N 3/008 |
| | | | | 706/14 |
| 8,958,912 | B2* | 2/2015 | Blumberg | G05B 19/42 |
| | | | | 700/259 |
| 9,020,636 | B2* | 4/2015 | Tadayon | F24S 25/70 |
| | | | | 700/247 |
| 9,031,692 | B2* | 5/2015 | Zhu | H04L 67/12 |
| | | | | 700/248 |
| 9,457,468 | B1* | 10/2016 | Elazary | B25J 9/161 |
| 9,643,314 | B2* | 5/2017 | Guerin | B25J 9/1605 |
| 9,661,477 | B1* | 5/2017 | Ebrahimi Afrouzi | H04W 4/08 |
| 9,840,007 | B1* | 12/2017 | Kuffner | G06F 30/20 |
| 10,173,320 | B1* | 1/2019 | Prisament | G05B 23/0227 |
| 10,226,869 | B2* | 3/2019 | Chizeck | B25J 9/1689 |
| 10,646,994 | B2* | 5/2020 | Shaw | B25J 9/1602 |
| 2004/0162638 | A1* | 8/2004 | Solomon | F41H 13/00 |
| | | | | 700/247 |
| 2015/0217449 | A1* | 8/2015 | Meier | B25J 9/1602 |
| | | | | 700/257 |
| 2016/0059415 | A1* | 3/2016 | Guerin | B25J 9/1664 |
| | | | | 700/257 |
| 2016/0129592 | A1* | 5/2016 | Saboo | G05D 1/0297 |
| | | | | 700/248 |
| 2016/0257000 | A1* | 9/2016 | Guerin | B25J 9/1605 |
| 2016/0311115 | A1* | 10/2016 | Hill | G06T 19/006 |
| 2017/0249745 | A1* | 8/2017 | Fiala | G02B 27/0093 |
| 2017/0269607 | A1* | 9/2017 | Fulop | B25J 13/006 |
| 2017/0282374 | A1* | 10/2017 | Matula | B25J 9/1689 |
| 2017/0282375 | A1* | 10/2017 | Erhart | B25J 9/1674 |
| 2017/0285628 | A1* | 10/2017 | Erhart | G06Q 10/00 |
| 2017/0286651 | A1* | 10/2017 | Erhart | G06F 21/31 |
| 2017/0286916 | A1* | 10/2017 | Skiba | H04L 67/42 |
| 2018/0071874 | A1* | 3/2018 | Bergeron | B25J 19/023 |
| 2018/0099409 | A1* | 4/2018 | Meier | B25J 9/1656 |
| 2018/0356895 | A1* | 12/2018 | Dailey | G06F 3/011 |
| 2019/0025818 | A1* | 1/2019 | Mattingly | G05D 1/0027 |
| 2020/0019237 | A1* | 1/2020 | Jackson | G06F 3/017 |

FOREIGN PATENT DOCUMENTS

| | | | |
|---|---|---|---|
| CN | 106997201 | A | 8/2017 |
| JP | 10225885 | A | 8/1998 |
| JP | 2002254374 | A | 9/2002 |
| JP | 2003291083 | A | 10/2003 |
| JP | 2009050970 | A | 3/2009 |
| JP | 4537464 | B2 | 9/2010 |
| JP | 4639343 | B2 | 2/2011 |
| JP | 2017047519 | A | 3/2017 |
| KR | 101015313 | B1 | 2/2011 |
| KR | 101273237 | B1 | 6/2013 |
| MX | 2009005853 | A | 12/2010 |

OTHER PUBLICATIONS

Gerkey, Brian P., and Maja J. Matarić. "A formal analysis and taxonomy of task allocation in multi-robot systems." The International Journal of Robotics Research 23.9 (2004): 939-954. http://robotics.stanford.edu/~gerkey/research/final_papers/mrta-taxonomy.pdf.

Panait, Liviu, and Sean Luke. "Cooperative multi-agent learning: The state of the art." Autonomous agents and multi-agent systems 11.3 (2005): 387-434. http://citeseerx.ist.psu.edu/viewdoc/dowload?doi=10.1.1.307.6671&rep=rep1&type=pdf.

Csokmai, L., Radu Catalin Tarca, Ovidiu Moldovan. Augmented reality in error troubleshooting inside flexible manufacturing cells. Recent Innovations in Mechatronics, 2. 10.17667/riim.2015.1-2/3, 2015. https://www.researchgate.net/publication/313266758_Augmented_reality_in_error_troubleshooting_inside_flexible_manufacturing_cells.

Hashimoto, Sunao, et al. "Touchme: An augmented reality based remote robot manipulation." 21st Int. Conf. on Artificial Reality and Telexistance, Proc. of ICAT2011, 2011. https://www.semanticscholar.org/paper/TouchMe-%3A-An-Augmented-Reality-Based-Remote-Robot-Hashimoto-Ishida/72c6faf945e34f442446ac1d97bb77e097a329cd.

* cited by examiner

PROVIDING LOGISTICAL SUPPORT FOR ROBOTS

The present disclosure relates generally to robotics, and relates more particularly to systems, non-transitory computer-readable media, and methods for providing logistical support for robots.

BACKGROUND

Robots are capable of carrying out complex series of actions, often automatically (i.e., without human intervention or assistance). For instance, robots are often used in applications such as navigation, mapping, transportation, telecommunications, emergency response, household tasks, and other applications that might be considered too time consuming, too dangerous, or too costly for humans to perform.

SUMMARY

The present disclosure describes a device, computer-readable medium, and method for providing logistical support for robots. In one example, the method includes receiving, at a centralized support center that is in communication with a plurality of robots, a query from a first robot of the plurality of robots that has been deployed to perform a task, wherein the query indicates an error encountered by the first robot and evidence of the error collected by the first robot, formulating, at the centralized support center, a proposed solution to resolve the error, wherein the formulating comprises soliciting an analysis of the evidence by a party other than the first robot, and delivering, by the centralized support center, the proposed solution to the first robot.

In another example, a device includes a processor of a centralized support center that is in communication with a plurality of robots and a computer-readable medium storing instructions which, when executed by the processor, cause the processor to perform operations. The operations include receiving a query from a first robot of the plurality of robots that has been deployed to perform a task, wherein the query indicates an error encountered by the first robot and evidence of the error collected by the first robot, formulating a proposed solution to resolve the error, wherein the formulating comprises soliciting an analysis of the evidence by a party other than the first robot, and delivering the proposed solution to the first robot.

In another example, a non-transitory computer-readable storage medium stores instructions which, when executed by a processor of a centralized support center that is in communication with a plurality of robots, cause the processor to perform operations. The operations include receiving a query from a first robot of the plurality of robots that has been deployed to perform a task, wherein the query indicates an error encountered by the first robot and evidence of the error collected by the first robot, formulating a proposed solution to resolve the error, wherein the formulating comprises soliciting an analysis of the evidence by a party other than the first robot, and delivering the proposed solution to the first robot.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides logistical support for robots. As discussed above, robots are often used in applications such as navigation, mapping, transportation, telecommunications, emergency response, household tasks, and other applications that might be considered too time consuming, too dangerous, or too costly for humans to perform. Although robots are capable of carrying out complex series of actions, often automatically (i.e., without human intervention or assistance), they may occasionally encounter situations in which they require human feedback. For instance, they may encounter inputs that are confusing or unexpected (e.g., referred to broadly as an error that cannot be processed using their local knowledge bases), and may send a sample of the input (e.g., in the form of a video clip, an error log, or some other form) for review by a human technician. In some cases, the technician may need to be dispatched to the field (i.e., to the location at which the input was encountered) to determine the root cause of the error. This can be very costly and may delay resolution of the error.

Examples of the present disclosure allow robots to obtain assistance in real time, both from remote human technicians, and from other robots, when they encounter inputs that are confusing or unexpected. In particular, other robots may assist in collecting evidence that can be used to diagnose the encountered error. In further examples, the other robots may collaborate to learn ideal solutions for resolving the error. In further examples still, an action planning environment may be provided in which human technicians can perform non-destructive problem exploration, e.g., through virtual reality (VR) or augmented reality (AR) visualizations and chat interactions created using evidence provided by the robots. These solutions may enable robots to diagnose and resolve errors in an efficient and cost-effective manner, even when human intervention is solicited.

Figure 1:
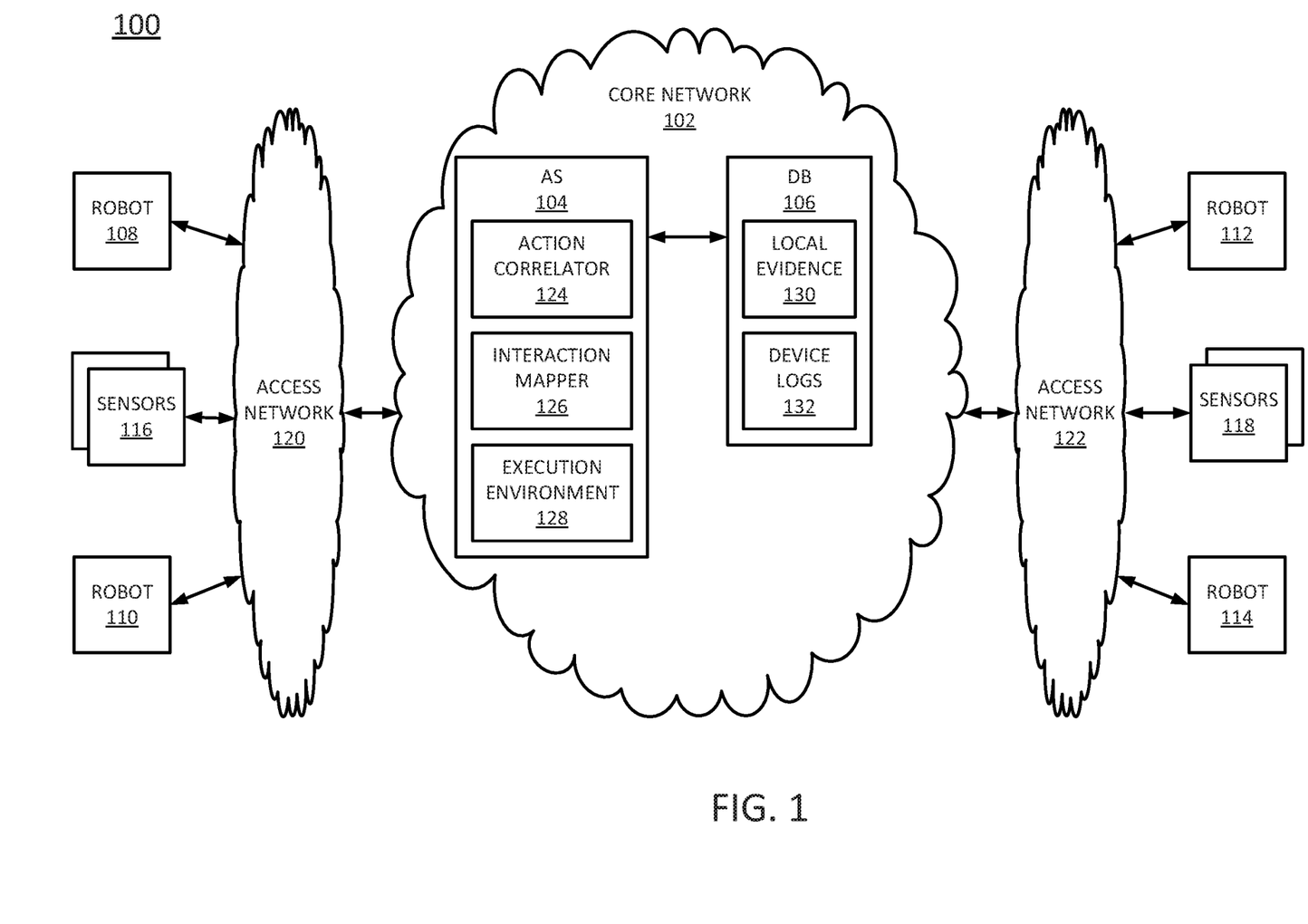
FIG. 1 illustrates an example network related to the present disclosure.

To better understand the present disclosure, FIG. 1 illustrates an example network 100 related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, 5G, and the like) related to the current disclosure. It should be noted that an IP network is broadly defined as a network that uses Internet Protocol to exchange data packets. Additional illustrative IP networks include Voice over IP (VoIP) networks, Service over IP (SoIP) networks, and the like.

In one embodiment, the network 100 may comprise a core network 102. In one example, the core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may also further comprise an Internet Service Provider (ISP) network. In one embodiment, the core network 102 may include an application server (AS) 104 and a database 106. Although a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more robots 108 and 110, while the access network 122 may be in communication with one or more robots 112 and 114. The robots 108, 110, 112, and 114 may comprise autonomous or semi-autonomous (i.e., autonomous but incorporating the ability to be controlled remotely by a human technician) devices that include sensors (e.g., imaging sensors, audio sensors, thermal sensors, pressure sensors, light sensors, smoke sensors, humidity sensors, motion sensors, infrared sensors, and/or the like) for detecting and recording information about a surrounding environment. The robots 108, 110, 112, and 114 may include mechanisms or systems that allow the robots to move through the surrounding environment, such as motors coupled to wheels, treads, tracks, propellers, or the like.

In one example, the robots 108, 110, 112, and 114 may be configured for wireless communication. In one example, any one or more of the robots 108, 110, 112, and 114 may have both cellular and non-cellular access capabilities and may further have wired communication and networking capabilities. The robots 108, 110, 112, and 114 may communicate with each other as well as with the AS 104. It should be noted that although four robots are illustrated in FIG. 1, any number of robots may be deployed.

In some examples, the network 100 may further include a sensor or sensors 116 and 118. These sensors 116 and 118 may comprise software and/or hardware sensors that are strategically placed in various fixed physical locations. These sensors 116 and 118 may also detect and record information about the surrounding environment, and may share this information directly with the robots 108, 110, 112, and 114 and/or with the AS 104. The sensors 116 and 118 may include, for instance imaging sensors, audio sensors, thermal sensors, pressure sensors, light sensors, smoke sensors, humidity sensors, motion sensors, infrared sensors, and/or the like.

In one example, the robots 108, 110, 112, and 114 may have installed thereon an application that can communicate, over the access networks 120 and/or 122 and the core network 102, with the AS 104 and/or DB 106. The application may perform the methods discussed below related to providing logistical support for robots. For instance, the application may collect data and send the data to the AS 104 for assistance in resolving errors encountered by the robot. The application may also attempt to carry out proposed solutions to the error that are provided by the AS 104.

Figure 5:
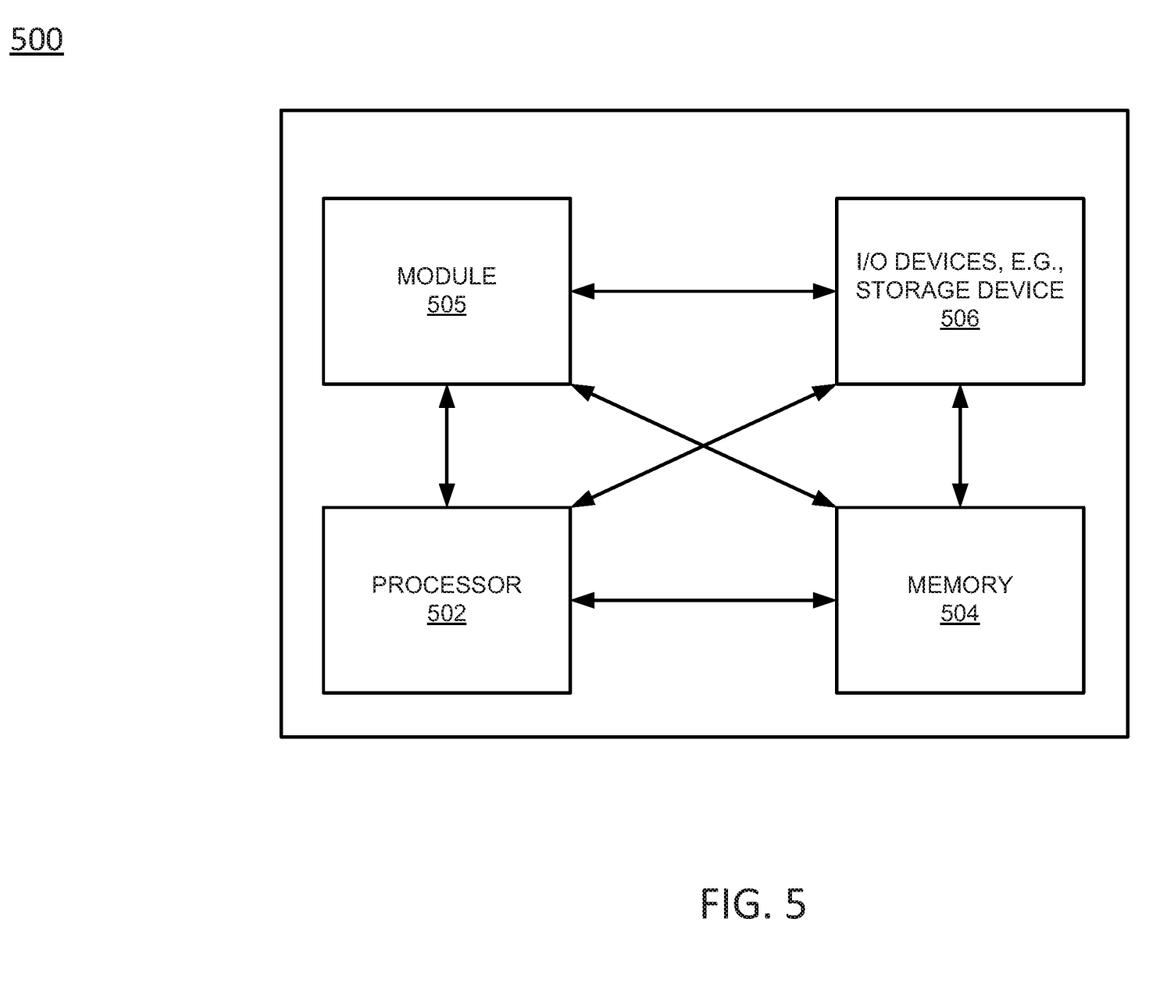
FIG. 5 depicts a high-level block diagram of a computing device specifically programmed to perform the functions described herein.

The AS 104 may comprise a computer programmed to operate as a special purpose computer, as illustrated in FIG. 5 and discussed below. In one example, the AS 104 may perform the methods discussed below related to providing logistical support for robots. For instance, in one example, the AS 104 hosts an application that communicates with one or more of the robots 108, 110, 112, and 114 and with the DB 106. The application may utilize data provided by the robots 108, 110, 112, and 114 and/or in the DB 106 to provide logistical support for the robots 108, 110, 112, and 114. This logistical support may include diagnosing and/or developing solutions to errors encountered by the robots 108, 110, 112, and 114. The logistical support may also include generating a simulated environment (e.g., a VR or AR environment) that simulates a robot's surrounding environment, so that a human technician can explore the environment remotely and formulate a solution without having to be physically dispatched to the site of the error. To accomplish these tasks, in one example, the AS 104 includes an action correlator 124, an interaction mapper 126, and an execution environment 128, which are discussed in greater detail in connection with FIG. 2.

In one example, the DB 106 stores information that is detected and recorded by the robots 108, 110, 112, and 114. To this end, the DB 106 may include a repository of local evidence 130 and a repository of device logs 132. The DB 106 may also store records of previously encountered errors, as well as the solutions (if any) to those errors. These records may be stored in the form of frequently asked questions (FAQs) or as behavioral models, for example. The records may be updated as the robots 108, 110, 112, and 114 learn solutions to new errors and new solutions to previously encountered errors.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional robots, endpoint devices, sensors, access networks, network elements, application servers, etc. without altering the scope of the present disclosure.

Figure 2:
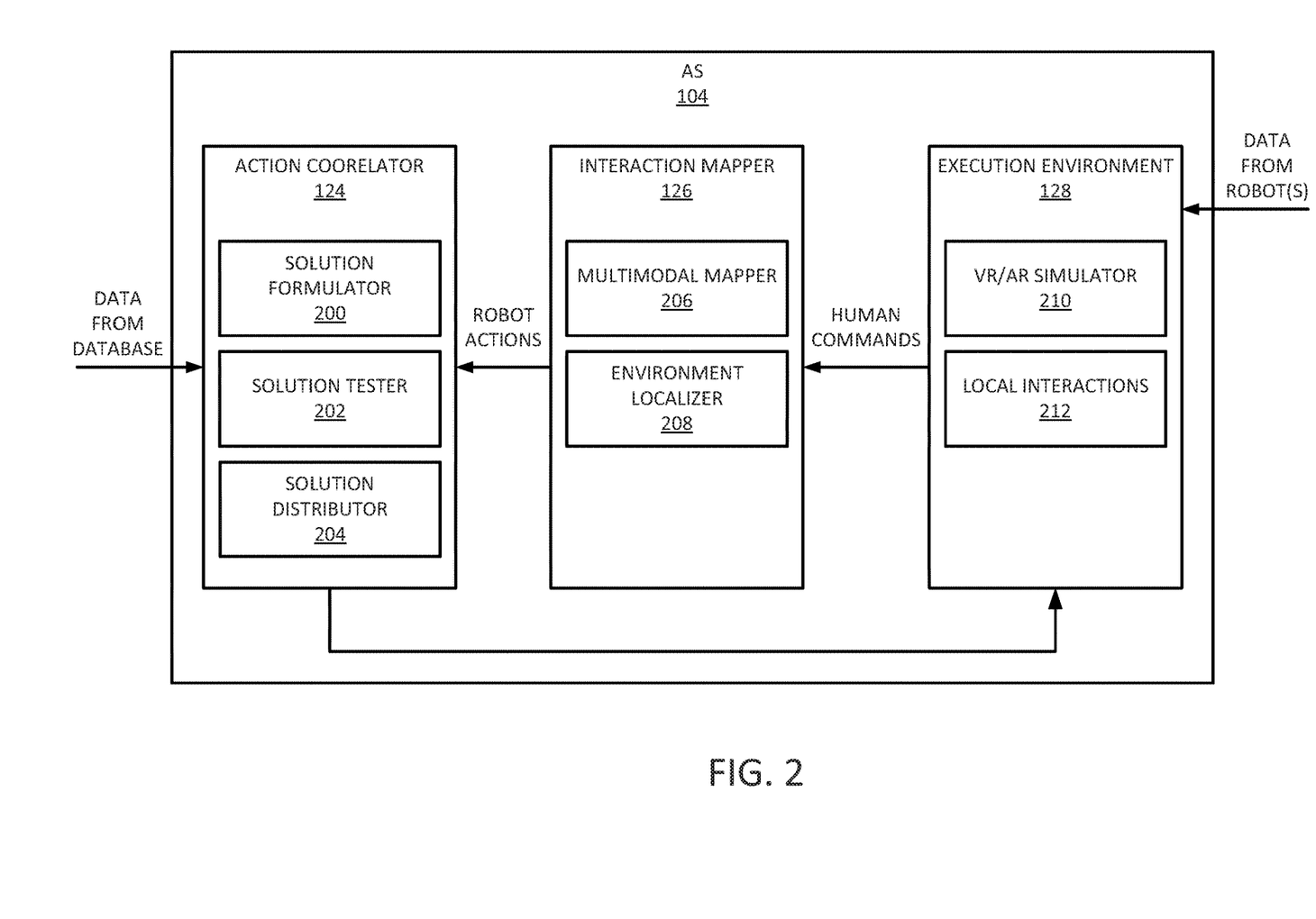
FIG. 2 is a block diagram illustrating one example of the application server of FIG. 1 in more detail.

FIG. 2 is a block diagram illustrating one example of the AS 104 of FIG. 1 in more detail. As discussed above, the AS 104 generally comprises an action correlator 124, an interaction mapper 126, and an execution environment 128.

The execution environment 128 receives data from a robot or robots and uses this data to create a virtual reality (VR) or augmented reality (AR) environment that simulates the environment surrounding the robot or robots. As discussed in greater detail below, the VR or AR environment may allow a human technician to experience the surrounding environment as if he or she were there and to initiate appropriate actions by the robot based on this experience. To this end, the execution environment 128 may comprise a VR/AR simulator 210 and a local interactions log 212.

The local interactions log 212 stores data provided by robots that describes the environments surrounding the robots. For instance, the local interactions log 212 may store video or audio data streamed by the robots, still images captured by the robots, sensor readings captured by the robots, device logs recorded by the robots, and/or other data. In one example, at least some of the data indicates an error encountered by one of the robots.

The VR/AR simulator 210 accesses the data stored in the local interactions log 212 and uses this information to create the VR or AR environment that simulates the environment surrounding one or more of the robots. In one example, the VR or AR environment is an immersive environment that allows a human technician to experience the surrounding environment as if he or she were there (e.g., potentially by using additional peripheral equipment such as a head mounted display, a touch screen, or the like).

The interaction mapper 126 performs local adaptation of general solutions attempted in the execution environment 128. For instance, the interaction mapper 126 may receive data from the execution environment 128 and translate the data into information that can be used to perform an action in the environment surrounding a robot or robots. In further examples, the interaction mapper 126 may modify or map a solution developed by a robot of a first type to a series of actions that can be performed by a robot of a second, different type. This would allow existing solutions to be applied to newer or different models or types of robots. For instance, an existing solution that works for a robot with an attached arm may be modified or mapped to a series of actions that can be performed by a robot without an attached arm. To facilitate these tasks, the interaction mapper 126 may comprise a multimodal mapper 206 and an environment localizer 208.

The multimodal mapper 206 receives as input commands from a human technician, made within the simulated VR or AR environment, and maps these commands to appropriate actions by a robot. The commands may be received in any one or more of a plurality of modalities. For instance, the commands may comprise text inputs (e.g., chat commands), spoken commands, gestures (e.g., hand gestures, limb gestures, body movements, eye movements, and so on), keyboard commands, and/or other types of inputs. As an example, the multimodal mapper 206 may map a spoken command to "rotate left" to a counterclockwise rotation instruction for a specific robotic component, e.g., a particular electric motor attached to a particular wheel and so on.

The environment localizer 208 examines the local environment surrounding the robot affected by a command, and determines whether and to what extent the command can be carried out. For example, if the local environment comprises a narrow corridor, the amount by which the robot may rotate left may be limited based on the physical dimensions of the corridor, the environmental conditions in the corridor, e.g., a wet surface in the corridor, and so on.

The action correlator 124 may receive suggested actions for a robot to perform from the interaction mapper 126 and may implement these suggested actions as part of a proposed solution for resolving an error encountered by the robot. To this end, the action correlator 124 may comprise a solution formulator 200, a solution tester 202, and a solution distributor 204.

The solution formulator 200 may formulate a proposed solution to an error that is encountered by a robot, where the proposed solution may be formulated based on the suggested actions from the interaction mapper 126 and/or on data supplied by the robot (and potentially other robots and/or sensors). This data (e.g., video or audio recordings, still images, sensor readings, and the like) may be stored in a database (e.g., DB 106) that is accessible by the solution formulator 200. The database may also include records of errors that were encountered in the past, and the solutions that helped to resolve these errors, as discussed above.

The solution tester 202 may test proposed solutions before delivering the proposed solutions to robots. In one example, testing of a solution may involve an interaction with the execution environment 128 to see whether the proposed solution is likely to resolve the error.

The solution distributor 204 may deliver proposed solutions (which may have been tested by the solution tester 202) to one or more robots. For instance, in one example, the solution distributor 204 may deliver a proposed solution to an error to a robot that has reported encountering the error. In another example, the solution distributor 204 may deliver the proposed solution to robots that have not reported encountering the error, e.g., so that the robots can store information about the proposed solution locally in case they do encounter the error in the future.

Thus, the AS 104 may operate as a centralized support center that robots may contact when they encounter errors that they cannot resolve on their own or through interaction with other robots. The centralized support center may provide support in the way of access to a database that stores records of known errors and solutions. The centralized support center may also provide assistance in the form of human technicians, and may provide support to the human technicians in the form of simulated VR or AR environments that allow the human technicians to observe the errors remotely and provide suggested actions.

Figure 3:
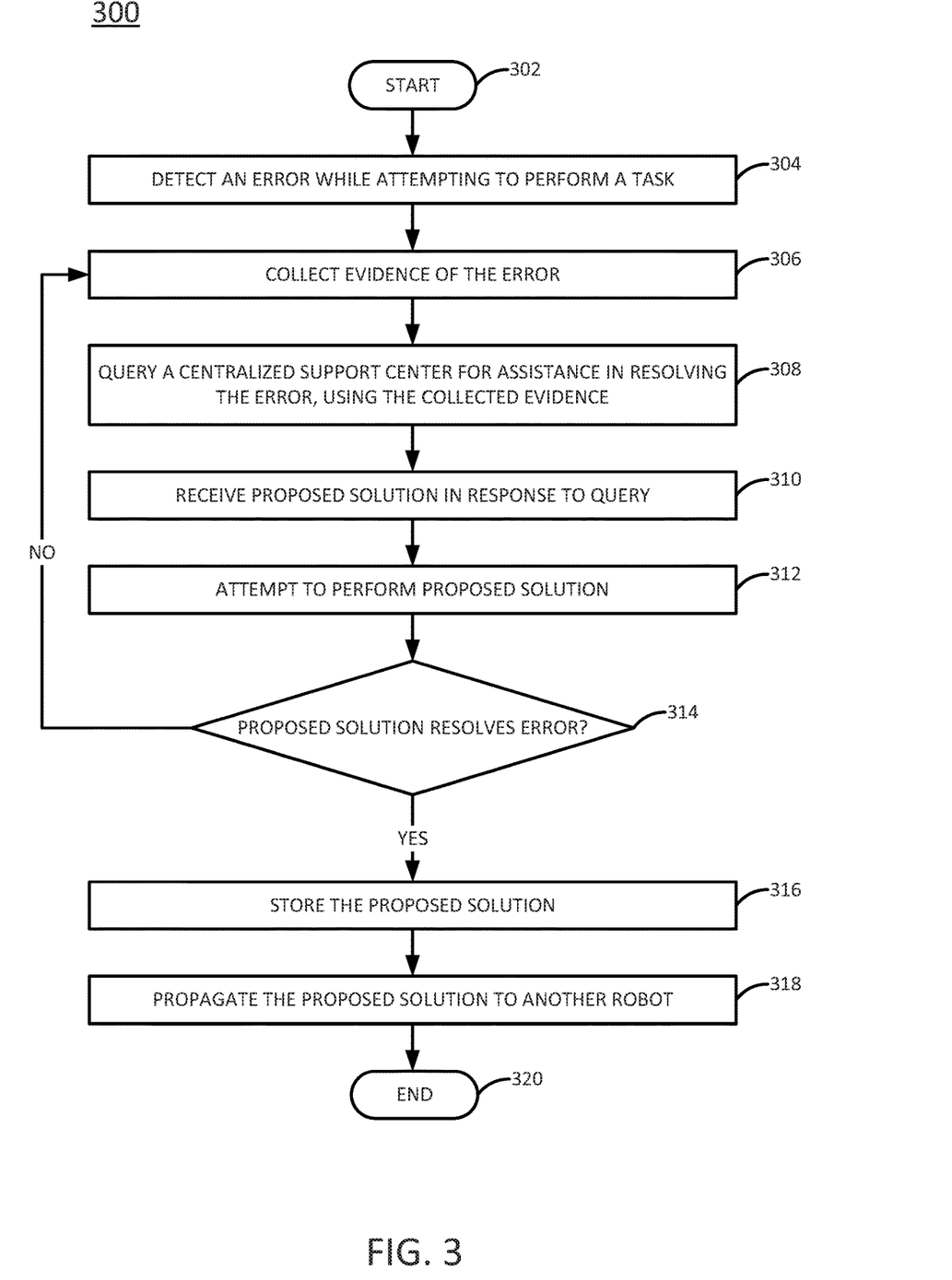
FIG. 3 illustrates a flowchart of an example method for providing logistical support for robots.

To further aid in understanding the present disclosure, FIG. 3 illustrates a flowchart of an example method 300 for providing logistical support for robots. In one example, the method 300 may be performed by a robot, e.g., one of the robots 108, 110, 112, and 114 illustrated in FIG. 1. However, in other examples, the method 300 may be performed by another device. As such, any references in the discussion of the method 300 to components of the network illustrated in FIG. 1 are not intended to limit the means by which the method 300 may be performed.

The method 300 begins in step 302. In step 304, an error is detected by a robot that has been deployed to perform a task. The error may comprise an unknown or unexpected condition encountered by the robot in the course of performing the task. For instance, if the robot has been deployed to perform a repair on a malfunctioning piece of remote cell tower equipment, the error may comprise an equipment condition that fails to meet a known condition (e.g., the robot does not know how to repair the condition). In another example, the error may comprise the failure of an attempted repair (e.g., the robot attempts to repair the condition, but the condition persists). As another example, if the robot has been deployed to purchase groceries for a user, the robot may find that the requested groceries are not available (e.g., the user asks for four ripe pears, but the grocery store only has two ripe pears).

In step 306, evidence of the error is collected. The robot may use one or more of its integrated sensors to collect this evidence (e.g., by recording a video of the observed error, taking photographs, recording the temperature of the immediate environment, recording an audio of the observed error, etc.). In one example, the evidence is collected by repeating an attempt to resolve the error (e.g., such that the evidence comprises a "replay" of the robot's attempt at the resolution). For instance, the robot may repeat actions that the robot has already taken, but this time the robot may record those actions (e.g., for review by a human technician). In another example, the evidence is collected by soliciting nearby devices (e.g., other robots, sensors, etc.) for evidence that the nearby devices have recorded. The evidence may comprise any sort of sensor data and/or device log that conveys some information about the environment surrounding the robot. For instance, the evidence may include video recordings, audio recordings, still images, temperature readings, pressure readings, humidity readings, information about the sizes and locations or nearby objects, technical specifications about nearby objects, and/or other information. As an example, if the error concerns a malfunctioning piece of remote cell tower equipment that the robot has been deployed to repair, the evidence might include information such as the geographic location (e.g., coordinates) of the equipment, the current weather at the geographic location, features of the geographic location (e.g., trees, mountains, etc.), the size of the equipment, the equipment's technical specifications, video and/or audio recordings of the remote cell tower equipment prior to the presence of the observed error and/or other information.

In step 308, a centralized support center, such as the application server 104 of FIG. 1, is queried for assistance using the evidence collected in step 306. In one example, the robot may engage in an automated solution-response dialog with the support center, where the purpose of the dialog is to search for stored records of similar errors (and their associated solutions). In this case, if a record of a similar error is located, the robot may try applying the associated previously stored solution to the error that the robot is currently encountering. The query may employ at least some of the evidence collected in step 306 to filter stored records of errors. This approach allows the robot to attempt to solve the error without human intervention.

In another example, the robot may stream the evidence collected in step 306 to the support center. The support center may, based on similarities between the query and one or more other pending queries, join multiple queries into a single joint query (where the joining may occur with the consent of the parties who submitted the queries). This allows multiple robots, which may be experiencing similar errors at the same time but potentially in different environments, to pool their evidence in the hopes of expediting a solution. In another example, other robots may provide evidence from their perspectives, even though the other robots may not be experiencing any errors (or may not be experiencing the same error).

In another example, the query may convey information that allows a human technician to prioritize the query in a queue of pending queries. For instance, the information conveyed in the query may include the geographic location of the error, the severity of the error encountered, the identification of the equipment experiencing the error, the type of equipment or device experiencing the error, and/or other information.

In step 310, a proposed solution is received in response to the query sent in step 308. In one example, the proposed solution is a solution that is associated with a stored record of a similar error. For instance, if a record of an error similar to the error detected in step 304 is found, then the solution associated with the similar error may be proposed as a possible solution to the present error. As an example, if a robot is deployed to purchase four ripe pears and finds that only two ripe pears are available, a stored solution may identify a suitable alternative (e.g., just purchase the two available pears, purchase the two available pears and also purchase two apples or mangoes, etc.).

In another example, the proposed solution comprises an interaction between the robot and a human technician. This interaction may involve the robot streaming evidence to the support center, which in turn may generate a virtual reality (VR) or augmented reality (AR) simulation of the robot's surrounding environment for inspection by the human technician. The simulation may also allow the human technician to control the robot remotely, e.g., to collect more evidence and/or to perform actions in an attempt to resolve the error. Remote control of the robot may be achieved for example, through use of a chat feature, spoken commands, gestures, keyboard commands, and/or any other protocols that map inputs from the human technician to appropriate actions by the robot. An "appropriate" action is understood to be an action that is performed on the proper scale for and considering the safety conditions of the robot's surrounding environment. For instance, a command to "rotate left" would not rotate the robot any further to the left than the surrounding environment allowed, e.g., not making contact with any structures in the immediate environment, making limited contact with only a non-permanent structure in the immediate environment, e.g., contacting a chair in the room, but not a wall in the room, and so on.

In another example, an interaction between the robot and a human technician may include the human technician collaborating with another human technician who is attempting to resolve a similar error. The other human technician may be interacting with another robot that is providing additional evidence from its surrounding environment.

In another example, the proposed solution may comprise the delivery of a tool or a part needed to repair the error. For instance, another robot or a drone may be deployed to provide the robot with tools, parts, or other items.

In another example, the robot may continue to attempt to resolve the error autonomously while interacting with the human technician. For instance, while the human technician is reviewing evidence provided by the robot, the robot may attempt or search for additional solutions (e.g., by using its own locally stored knowledge, searching records stored at the support center, etc.).

In step 312, the proposed solution received in step 310 is attempted. For instance, the robot may attempt to carry out a series of actions that is part of the proposed solution.

In step 314, it is determined whether the proposed solution resolved the error. If it is determined in step 314 that the proposed solution did resolve the error, then the method 300 proceeds to step 316.

In step 316, the proposed solution may be stored as part of a local knowledge base (e.g., in the DB 106 of FIG. 1 or another database). The proposed solution may be annotated (e.g., by the human technician), e.g., with tags, to facilitate locating the proposed solution in the future (e.g., if a similar error is encountered). The proposed solution may also be annotated to indicate the minimum amount of evidence that may be needed to diagnose and repair the error.

In step 318, the proposed solution may be propagated to another robot. For example, if another robot has reported encountering a similar error, the robot may forward the proposed solution to the other robot. In another example, the robot may forward the solution to any other robot that is of a similar model, that is located in a similar geographic location, or that shares other similarities (e.g., physical similarities, or similar functions to be performed) with the robot.

If, however, it is determined in step 314 that the proposed solution did not resolve the error, then the method 300 may return to step 306 and proceed as described above to query the support center for a new proposed solution, possibly collecting and providing new evidence to facilitate the new proposed solution.

Once the error has been resolved, and any appropriate follow up actions have been taken (e.g., in accordance with steps 316 and/or 318), the method 300 ends in step 320.

In one example, any queries and data sent by a robot to the centralized support center may be encrypted to protect privacy. For instance, the robot may inadvertently capture data (e.g., images) relating to personal items, proprietary corporate information, or the like. Encryption of this data may prevent the data from being exploited by third parties.

Figure 4:
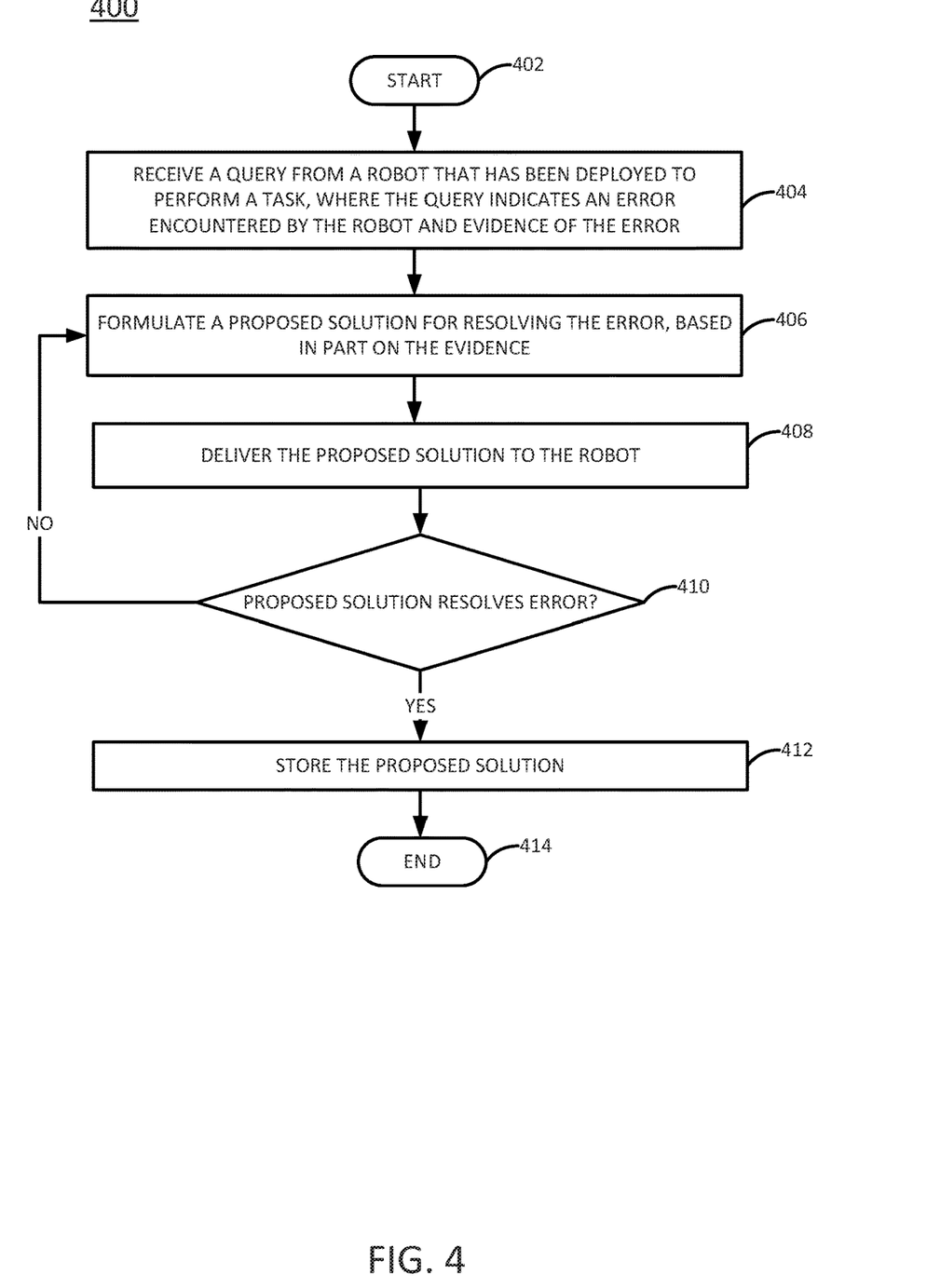
FIG. 4 illustrates a flowchart of another example method for providing logistical support for robots.

FIG. 4 illustrates a flowchart of another example method 400 for providing logistical support for robots. In one example, the method 400 may be performed by an application server, e.g., AS 104 illustrated in FIG. 1, which operates as a centralized support center for a fleet of robots. However, in other examples, the method 400 may be performed by another device. As such, any references in the discussion of the method 400 to the AS 104 of FIG. 1 are not intended to limit the means by which the method 400 may be performed.

The method 400 begins in step 402. In step 404, a query is received from a robot that has been deployed to perform a task. The query may indicate an error that the robot experienced while attempting to perform the task and seek assistance in resolving the error. For instance, if the robot has been deployed to perform a repair on a malfunctioning piece of remote cell tower equipment, the error may comprise an equipment condition that fails to meet a known condition (e.g., the robot does not know how to repair the condition). In another example, the error may comprise the failure of an attempted repair (e.g., the robot attempts to repair the condition, but the condition persists). The query may also include evidence (e.g., device logs, video or audio recordings, still photographs, sensor readings, etc.) of the error, which may be recorded and sent by the robot. As an example, if the error concerns a malfunctioning piece of remote cell tower equipment that the robot has been deployed to repair, the evidence might include information such as the geographic location (e.g., coordinates) of the equipment, the current weather at the geographic location, features of the geographic location (e.g., trees, mountains, etc.), the size of the equipment, the equipment's technical specifications, and/or other information. The evidence may be supplied by the robot that has encountered the error, by other robots, and/or by sensors in the environment surrounding the robot that encountered the error.

In step 406, a proposed solution may be formulated in response to the query. For instance, the proposed solution may include a suggestion for resolving an error indicated in the query, where the suggestion is based in part on the evidence of the error provided by the robot. Formulating the solution may include testing the solution, as noted above. In one example, the proposed solution is formulated by soliciting analysis of the evidence by or putting the robot in communication with a second party (i.e., a party other than the robot from which the query was received), such as a database, another robot, and/or a human technician.

For instance, in one example, the proposed solution is formulated through an automated solution-response dialog with the robot, where the purpose of the dialog is to search for stored records of similar errors (and their associated solutions).

In another example, formulating the proposed solution may include joining the query with one or more other similar pending queries to form a single joint query. This allows the AS 104 to collect and review evidence from multiple robots, which may be experiencing similar errors at the same time but potentially in different environments, in the hopes of expediting a solution. In another example, other robots may provide evidence from their perspectives, even though the other robots may not be experiencing any errors (or may not be experiencing the same error).

In another example, formulating the proposed solution may include generating a virtual reality (VR) or augmented reality (AR) simulation of the robot's surrounding environment for inspection by a human technician. The AR or VR simulation may be created based on evidence that is streamed by the robot to the AS. The simulation may also allow the human technician to control the robot remotely via the AS, e.g., to collect more evidence and/or to perform actions in an attempt to resolve the error. Remote control of the robot may be achieved for example, through use of a chat feature, spoken commands, gestures, keyboard commands, and/or any other protocols that map inputs from the human technician to appropriate actions by the robot.

In another example, formulating a proposed solution may involve a human technician evaluating multiple solutions proposed by multiple robots operating in potentially different environments, and selecting the proposed solution that appears best suited to resolving the error (e.g., the most efficient or the least costly or the best suited according to some other criterion).

In step 408, the solution is delivered to the robot from which the query was received, so that the robot may attempt to apply the proposed solution to the error.

In step 410, it is determined whether the proposed solution resolved the error. If it is determined in step 410 that the proposed solution did resolve the error, then the method 400 proceeds to step 412.

In step 412, the proposed solution may be stored, e.g., in a database, for future use. The proposed solution may be annotated (e.g., by the human technician), e.g., with tags, to facilitate locating the proposed solution in the future (e.g., if a similar error is encountered). The proposed solution may also be annotated to indicate the minimum amount of evidence that may be needed to diagnose and repair the error.

If, however, it is determined in step 410 that the proposed solution did not resolve the error, then the method 400 may return to step 406 and proceed as described above to formulate a new proposed solution. Formulation of a new proposed solution may include requesting additional evidence of the error and/or the surrounding environment from one or more robots.

Once the error has been resolved and the associated solution stored, the method 400 ends in step 414.

In further examples, the AS 104 or centralized support center may use data provided by a robot to monitor one or more of the robot's performance metrics, such as speed, efficiency, or the like. In this case, the error encountered by a robot may be its own performance, which it may self-report to the support center for resolution. If a performance metric is lower than expected (e.g., some threshold amount lower than the average for the fleet of robots), then the method 400 may be initiated to resolve the error of the robot's relatively low performance metric.

Moreover, further examples of the disclosure can be extended to situations in which robots are deployed to perform tasks, but do not necessarily encounter errors. That is, examples of the present disclosure can assist robots, or robots assisted by human technicians, in learning new tasks.

FIG. 5 depicts a high-level block diagram of a computing device specifically programmed to perform the functions described herein. For example, any one or more components or devices illustrated in FIG. 1 or described in connection with the methods 300 or 400 may be implemented as the system 500. For instance, a robot or an application server could be implemented as illustrated in FIG. 5.

As depicted in FIG. 5, the system 500 comprises a hardware processor element 502, a memory 504, a module 505 for providing logistical support for robots, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for providing logistical support for robots may include circuitry and/or logic for performing special purpose functions relating to performing tasks, collecting and analyzing evidence of errors, and formulating proposed solutions for resolving errors. The input/output devices 506 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for providing logistical support for robots (e.g., a software program comprising computer-executable instructions) can be loaded into memory 504 and executed by hardware processor element 502 to implement the steps, functions or operations as discussed above in connection with the example methods 300 or 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for providing logistical support for robots (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
  receiving, by a processor of a centralized support center that is in communication with a plurality of robots, a query from a first robot of the plurality of robots that has been deployed to perform a task, wherein the query indicates an error encountered by the first robot and evidence of the error collected by the first robot;
  receiving, by the processor, further evidence of the error from a perspective of a second robot of the plurality of robots that is separate from the first robot;
  formulating, by the processor, a proposed solution to resolve the error, wherein the formulating comprises soliciting an analysis of the evidence and the further evidence by a party other than the first robot; and delivering, by the processor, the proposed solution to the first robot.

2. The method of claim 1, wherein the evidence comprises sensor data collected by the first robot from an environment surrounding the first robot.

3. The method of claim 1, wherein the evidence comprises a device log of the first robot.

4. The method of claim 1, wherein the evidence comprises a video of an attempt by the first robot to resolve the error.

5. The method of claim 1, wherein the further evidence comprises sensor data collected by the second robot from an environment surrounding the second robot.

6. The method of claim 1, wherein the further evidence comprises a device log of the second robot.

7. The method of claim 1, wherein the party is the second robot.

8. The method of claim 7, wherein the second robot has reported encountering an error that is similar to the error encountered by the first robot.

9. The method of claim 1, wherein the party is a human technician.

10. The method of claim 1, wherein the formulating comprises:
using the evidence to generate a simulated environment that simulates an environment surrounding the first robot;
receiving a command from the party interacting with the simulated environment; and
mapping the command to an action to be taken by the first robot.

11. The method of claim 10, wherein the simulated environment comprises a virtual reality environment.

12. The method of claim 10, wherein the simulated environment comprises an augmented reality environment.

13. The method of claim 10, wherein the command is a text command.

14. The method of claim 10, wherein the command is a spoken command.

15. The method of claim 10, wherein the command is a gesture.

16. The method of claim 10, wherein the command is a keyboard command.

17. The method of claim 10, wherein the mapping is scaled to the environment surrounding the first robot.

18. The method of claim 1, further comprising:
storing a record of the error and the proposed solution, responsive to the proposed solution resolving the error.

19. A device comprising:
a processor of a centralized support center that is in communication with a plurality of robots; and
a computer-readable medium storing instructions which, when executed by the processor, cause the processor to perform operations, the operations comprising:
receiving a query from a first robot of the plurality of robots that has been deployed to perform a task, wherein the query indicates an error encountered by the first robot and evidence of the error collected by the first robot;
receiving further evidence of the error from a perspective of a second robot of the plurality of robots that is separate from the first robot;
formulating a proposed solution to resolve the error, wherein the formulating comprises soliciting an analysis of the evidence and the further evidence by a party other than the first robot; and
delivering the proposed solution to the first robot.

20. A non-transitory computer-readable storage medium storing instructions which, when executed by a processor of a centralized support center that is in communication with a plurality of robots, cause the processor to perform operations, the operations comprising:
receiving a query from a first robot of the plurality of robots that has been deployed to perform a task, wherein the query indicates an error encountered by the first robot and evidence of the error collected by the first robot;
receiving further evidence of the error from a perspective of a second robot of the plurality of robots that is separate from the first robot;
formulating a proposed solution to resolve the error, wherein the formulating comprises soliciting an analysis of the evidence and the further evidence by a party other than the first robot; and
delivering the proposed solution to the first robot.

* * * * *